May 30, 1961    R. L. ALDER    2,986,693
ELECTRICAL LOGGING SYSTEM
Filed Jan. 21, 1958    4 Sheets-Sheet 1

INVENTOR.
ROBERT L. ALDER
BY James B. Hamsell
ATTORNEY

WAVE FORMS

INVENTOR.
ROBERT L. ALDER

United States Patent Office 2,986,693
Patented May 30, 1961

2,986,693
ELECTRICAL LOGGING SYSTEM
Robert Lee Alder, La Canada, Calif., assignor, by mesne assignments, to Dresser Industries, Inc., Dallas, Tex., a corporation of Delaware
Filed Jan. 21, 1958, Ser. No. 710,597
11 Claims. (Cl. 324—1)

This invention relates to electrical well logging systems and more particularly to a system wherein a plurality of resistivity curve samples are transmitted to surface indicating apparatus on a time-sharing basis.

One of the oldest, and to some extent, the most reliable methods of obtaining information on the lithology of the subsurface strata surrounding an oil well borehole or the like is the electrical well log. While users of such electrical logs have differed widely as to the electrode spacings and types of curves which reveal the most, it has more or less generally been agreed that a number of curves having lithographical pertinence are desirable. The principal types of curves which are best have generally been agreed upon; i.e., the natural potential or spontaneous D.-C. voltage of the subsurface strata, the so-called "normal" curves and the so-called "lateral" curves. The natural potential or N.P. curves are obtained by sampling the D.C. voltages of the subsurface strata without establishing any artificial or induced potential field therein, whereas both "normal" and "lateral" curves require the establishment of potential fields adjacent the borehole, which fields are then detected at points remote from the current establishing means and their magnitudes correlated with characteristics of the geological formations through which the borehole extends.

The "normal" curves are generally measured between a pickup electrode and a remote electrode or sheath ground whereas the "lateral" curves generally measure the voltage difference between a pair of pickup electrodes. It is agreed that the "normal" curves provide information on the formations immediately adjacent the borehole whereas the "lateral" curves provide information on strata farther removed from the borehole. Though, as noted, users of electrical logs disagree as to optimum electrode spacings, all do agree upon the desirability of obtaining a maximum number of informational curves with a minimum conductor cable with the electrodes so orientated with respect to the subsurface instrument that the reference for all curves is the same. The manipulation of current and pickup electrodes in order to attempt to provide a desired set of curves which are, at the same time, properly referenced to or close to the 0″ electrode, for example, is characteristic of the electrical logging industry.

At the present time, most electrical logging systems require at least a six-conductor cable to provide three resistivity curves and a natural potential which are simultaneously obtained. While the number of conductors in the cable can obviously be increased to provide a greater number of resistivity curves, it is apparent to those familiar with cable construction that the increase in the number of conductors imposes numerous limitations on the overall system, not the least of which is one of economics. Then too, the use of large numbers of conductors in a single cable sheath creates an excess weight problem with the attendent stretching that makes it difficult to correlate detected signals with the depth at which they are made.

The present invention seeks to obviate many of the disadvantages of present electrical logging systems by employing a system of relays in the conductor leads which, through carefully chosen circuit combinations, provide a substantial number of additional informational curves, on a time-sharing basis, without the disadvantages attending an increase in the size of the cable or, for that matter, permits the use of a three conductor cable. While the time-sharing proposal of the instant invention does interfere with the simultaneousness of the resistivity curves obtained, the established fields are sampled sufficiently often to provide an accurate indication of the changes in the subsurface lithology.

In accordance with these previously described shortcomings present in electrical logging systems, an object of the present invention is to provide a well logging system which permits more information to be obtained on the subsurface lithology for a given number of conductors.

Another object of the present invention is to provide an electrical well logging system wherein the number of resistivity curves may be increased without an increase in the number of subsurface electrodes employed.

Yet another object of the invention is to provide an electrical logging system wherein one or more resistivity curves are transmitted to surface equipment on a time-sharing basis that automatically synchronizes subsurface sampling and associated surface indicating means.

Other objects of the invention are to provide a system that is more economical, simpler in construction, and which requires less servicing.

A feature of the invention pertains to the use of high temperature, relatively fast operate relays, the windings of which are serially connected in one or more of the conductors, situated in the subsurface instrument.

Another feature of the invention relates to means for establishing a plurality of electrical fields adjacent the subsurface instrument during a borehole traverse and cooperating means to detect at least some of these fields on a time-sharing basis.

Yet another feature of the present invention pertains to the cooperation of means for establishing a plurality of potential fields, means for associating one or more of the conductors of the cable with more than one of the detecting means or electrodes, means including conductors and electrodes other than the ones carrying current at a given time for sampling an established field, and means responsive to the current flow in the conductors for controlling the means for associating the conductors and various electrodes.

By judicious swapping of current and signal leads and electrodes through the use of switching devices in the conductor circuits, logging configurations similar to the exemplary embodiments disclosed herein are obtained. These permit four or more curves, correlatable with germane characteristics of the subsurface strata, to be obtained during one traverse of the extent of the borehole.

These and other objects and features may be more fully understood when the following detailed description is read with reference to the accompanying drawings in which:

Fig. 1 represents a surface commutator for an exemplary electrical logging system in accordance with the present invention;

Fig. 2 schematically displays indicating channels for lithographical information obtained by detecting means of the exemplary electrical logging system;

Fig. 5 is an alternate embodiment of the subsurface circuit and electrode arrangement represented by Fig. 3;

Fig. 6 is a diagrammatic representation of a subsurface instrument or logging tool with the relative positions of the exemplary electrodes of the disclosed logging system shown thereon;

Fig. 7 is an explanatory legend of the contact nomenclature used in Figs. 3 and 5;

Figure 1:
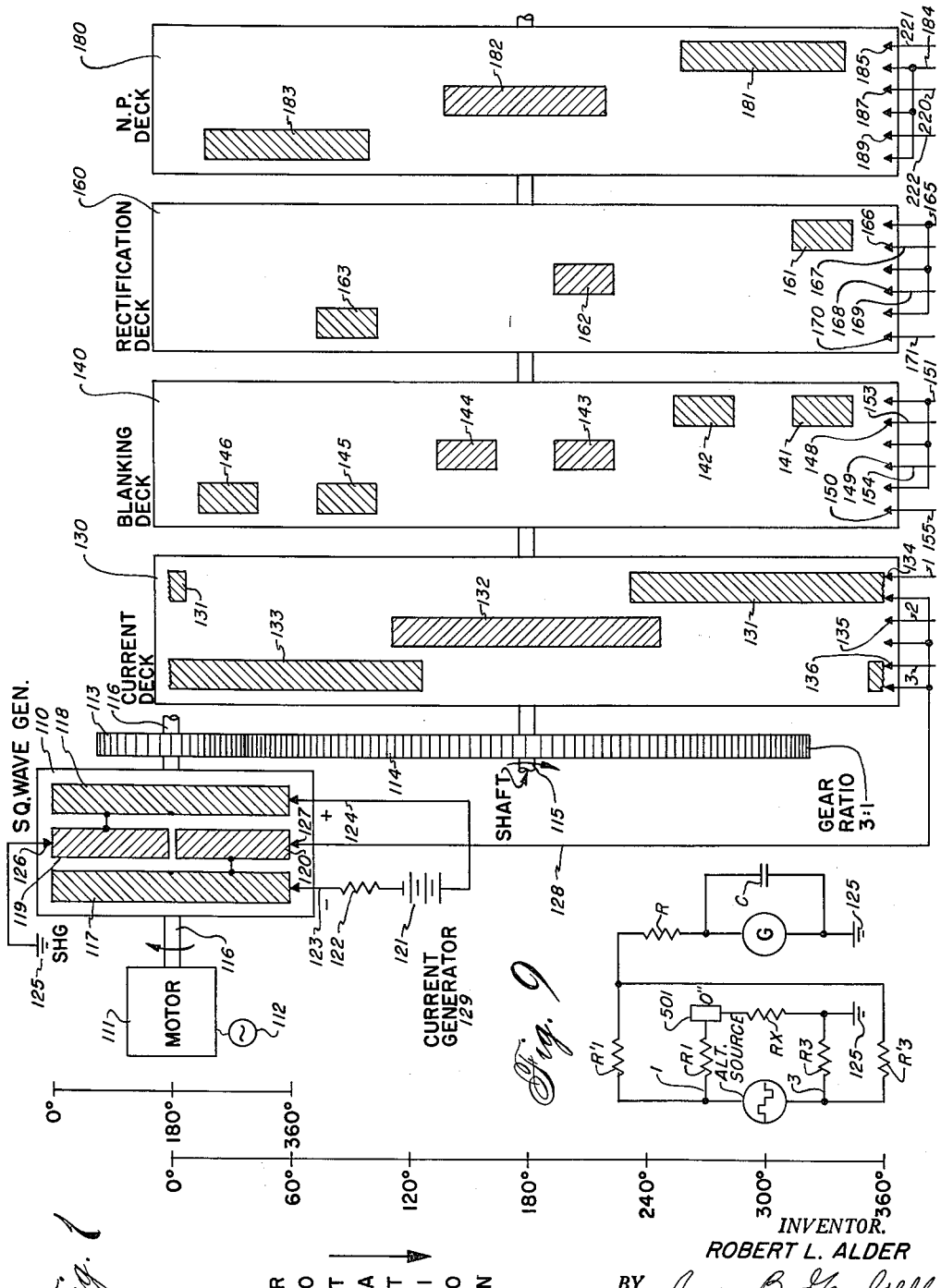

Fig. 8 indicates the manner in which Figs. 1 through 4 should be juxtaposed to illustrate an exemplary electric logging system and accompanying wave forms in accordance with the present invention; and Fig. 9 is a schematic of the measuring circuit employed with the circuit of Fig. 5 to obtain a bridge curve.

Before describing the exemplary electrical logging system in detail, it is well to understand broadly its function. The rationale of the system is roughly as follows:

A mechanical surface commutator generates an alternating square wave which, during each rotation of the commutator, connects the current over one of the conductors to the subsurface instrument. In addition to a current deck, which cooperates with the mechanical square wave generator part of the commutator to serially place an alternating square wave on each of the conductors in turn, are other decks which perform necessary functions relating to the detection and display of samples of the fields established by the current paths. A blanking deck properly oriented with respect to the current emanating deck is provided to prevent current spikes from being transmitted from the subsurface pickup electrode configurations to the surface indicating or display means. Further, a rectification deck, synchronized with the blanking deck, is provided to reverse the polarity of one of the two signals passed through the blanking circuit for each establishment of the current field adjacent the subsurface instrument.

As a result of this arrangement, alternating current fields are serially established between each of the conductors and sheath ground and, as each is established, it is sampled by a group of conductors and electrodes other than the instant current carrying ones and gated to an appropriate amplifying and indicating means at the surface. The blanking and rectification means are associated with the signal channel of a particular sampled potential. The blanking deck prevents the current spikes from proceeding through the signal channel. After the signals are blanked, a positive and negative square wave representing the intermediate portion of the signal is applied through amplifying means to the rectification gate. The rectification deck acts to reverse the polarity of the negative square pulse so that a pair of positive square pulses are applied to pulse stretching means. These pulse stretching means extend square wave signals to provide a D.-C. input to the appropriate galvanometer or other indicating means.

The mechanical surface commutator also includes an N.P. deck, synchronized with the other segments, which permits the appropriate conductor and electrode combinations to be connected to separate N.P. indicating means.

While, as noted above, opinions differ as to the "best" set of resistivity curves and "best" electrode spacings, for illustrative purposes the exemplary embodiment of the present invention is arranged to provide a set including a short normal (SN), a short lateral (SL), a long lateral (LL) and a natural potential (NP). An alternative embodiment also provides a bridge or resistance curve. The electrode spacings chosen for the exemplary system are obtained by using 0", 20", 109" and 250" bands. In addition to these, a sheath ground, which may be considered as an electrode, is utilized. Obviously other combinations including additional electrodes are possible.

Fig. 6 schematically illustrates the relationship between the electrodes and the subsurface instrument. It also, in a fragmented way, shows a means for causing the instrument to traverse the extent of a borehole. The subsurface instrument 610 is shown supported by a cable 612 in a borehole 611 with electrodes 301—304 and alternate electrodes 501—504 associated therewith. The distances electrodes 302—304 (502—504) are removed from the referenced electrode 301 (501) are also shown in Fig. 6, these being 20", 109" and 250", respectively. Sheath ground 125 is shown as an electrode though it actually represents a portion of the cable 612, 50 to 100 feet remote from the subsurface instrument 610. The cable 612 is shown threaded over a sheave wheel 613 and cooperating with a hoist drum 614, which may be caused to reel the cable in or out. Slip rings (not shown) cooperate with the cable drum to electrically connect the conductors 1, 2, 3 and sheath of the cable to the surface apparatus.

Looking in more detail at the exemplary logging system, it can be seen that Fig. 1 schmatically represents a mechanical commutator, the circumference of which has been laid out between the limits of 0° and 360°. The mechanical commutator includes square wave generator 110, a current deck 130, a blanking deck 140, a rectification deck 160 and an N.P. deck 180. The square wave generator 110 is driven by motor 111, supplied from an alternating current source 112, which in turn drives the current deck 130, the blanking deck 140, the rectification deck 160 and the N.P. deck 180 by virtue of a 3:1 gear reduction. The shaft 116 of the motor 111 is directly connected to the square wave generator 110. A gear 113 is also fixedly connected to shaft 116 to drive a gear 114 which, in turn, is fixedly attached to shaft 115, which shaft rotates decks 130, 140, 160 and 180. With the 3:1 gear ratio employed, the square wave generator 110 makes three complete revolutions for each 360° rotation of decks 130, 140, 160 and 180. If the square wave generator 110 is rotated at 1800 r.p.m. by the motor 111, for example, and in the direction indicated by the arrow, the decks 130, 140, 160 and 180 are driven at 600 r.p.m. which generates a 30 c.p.s. square wave. This square wave is applied to each of the three conductors 1, 2 and 3 for a rotational period of 120° or, what is the same thing, a complete revolution of the square wave generator 110.

The square wave generator 110 includes two rotating segments 117 and 118 which comprise 360° on the drum of the square wave generator 110 and two rotating segments 119 and 120 which comprise slightly less than 180° each. As can be seen in Fig. 1, segment 119 is permanently joined to segment 118 and segment 120 is permanently joined to segment 117. On the contrary, segments 117 and 118 are temporarily shorted when the brushes 126 and 127 are transferring from one of the two segments 119 and 120 to the other. A current generator 129 including a battery 121 and a series resistor 122 is connected between brushes 123 and 124 which, in turn, contact 360° segments 117 and 118, respectively. Sheath ground 125 is connected to a brush 126 that alternately contacts segments 119 and 120, whereas a brush 127, which is 180° out of phase with brush 126, alternately contacts segments 119 and 120. The alternation of brushes 126 and 127 places an alternating square wave over lead 128 to one set of the brushes associated with current deck 130.

With this physical arrangement, as the square wave generator 110 rotates, the positive voltage applied via brush 124 and segment 118, and the negative voltage applied via brush 123 and segment 117 is alternately placed between lead 128 and sheath ground 125 by virtue of segments 119 and 120. This alternating current square wave is placed between one of the conductors 1, 2 or 3 and sheath ground 125 during each 120° rotation of the current deck 130, as will be more fully explained below.

It will be noted in considering the square wave generator 110 that segments 119 and 120 do not quite constitute 180° segments, rather they are a few degrees less than 180°. This provides transitional blanking for the current spikes which occur when the polarity is switched.

Figure 4:
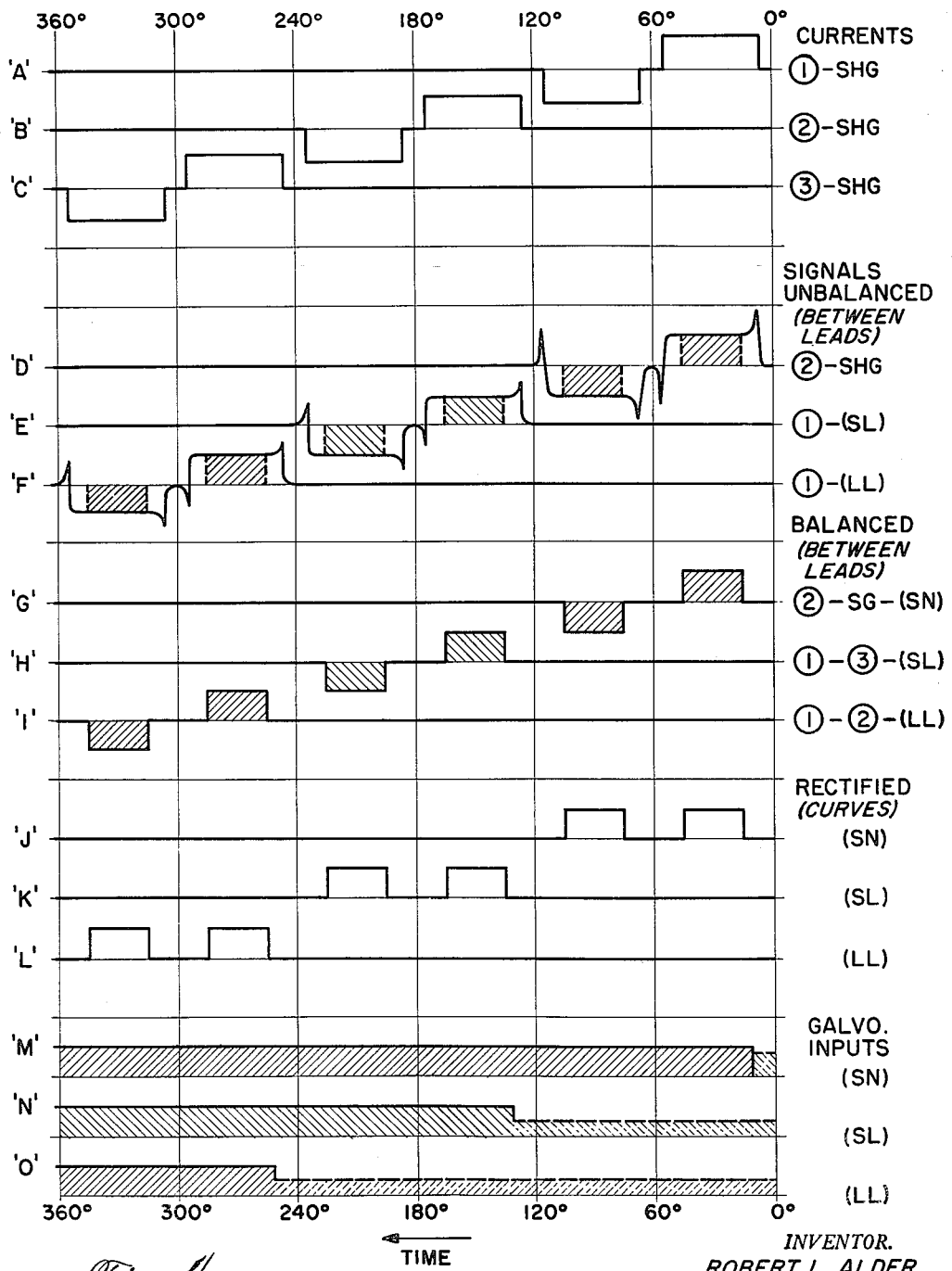
Fig. 4 is a collection of current and signal wave forms at various points in the exemplary electrical logging system compositely disclosed in Figs. 1, 2 and 3.

The alternating square wave generated and placed between lead 128 and sheath ground 125 is connected to one brush associated with each of the three rotating segments 131, 132 and 133 of current deck 130. Segment 131 is connectable by way of a brush 134 to conductor 1; segment 132 is connectable by way of a brush 135 to conductor 2; and segment 133 is connectable by way of a brush 136 to conductor 3. It is to be noted that segments 131, 132 and 133 overlap to some extent in order to prevent an open circuit from occurring when the current is transferred from one conductor to another. The amount of this overlap is not too critical. As the current deck 130 rotates, the alternating current wave applied to segment 131 over lead 128 is placed between conductor 1 and sheath ground for approximately 120° rotation of the current deck 130 or a full rotation of the square wave generator 110. As the current deck 130 continues to rotate in the direction shown, the alternating square wave on lead 128 is placed on conductor 2 by way of brush 135 and segment 132, and, finally, the last 120° of rotation of the current deck 130 places the alternating current between conductor 3 and sheath ground 125. As a result of this mechanical commutation, the 30 c.p.s. alternating current square wave is sequentially placed between conductor 1 and sheath ground, conductor 2 and sheath ground and conductor 3 and sheath ground. The wave forms of this alternating current are shown in Fig. 4, curves A, B, and C, respectively. It is, of course, apparent that the sheath ground is for all intents and purposes a fourth conductor though not so called.

Figure 2:
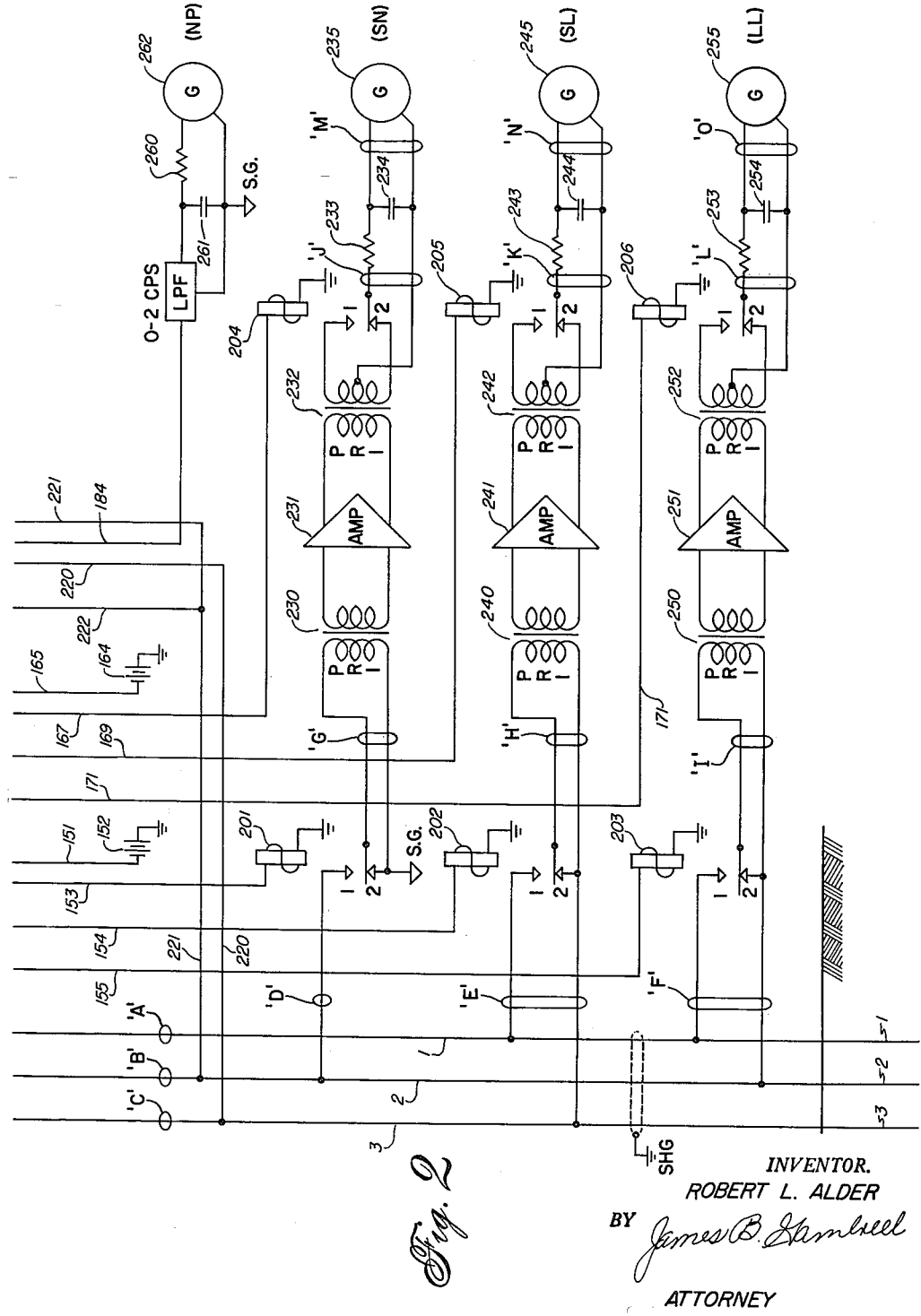

The blanking deck 140 and the rectification deck 160 are phased with respect to the current deck 130 so as to perform gating operations for samples of the sequentially established potential fields as they are transferred to their respective surface indicating means (shown in Fig. 2). The blanking deck 140 includes rotating segments 141, 142, 143, 144, 145 and 146, ascending pairs of which are associated with a common brush and individual brushes 148, 149 and 150, respectively. As the commutator shaft 115 rotates the decks 130, 140, 160 and 180, the commoned brushes, which are connected over lead 151 to a battery 152, complete a circuit sequentially through brushes 148, 149 and 150 and leads 153, 154 and 155 through the windings of blanking relays 201, 202 and 203, respectively to ground. The segments 141 and 142, which represent approximately 50 percent on a time basis of the positive and negative current half-cycles placed between conductor 1 and sheath ground, complete the circuit through blanking relay 201 twice during each period of current application to the formation over conductor 1. The operation of relay 201 passes only the intermediate part of the positive and negative signals detected during the presence of current on conductor 1 with the result that pickup voltage spikes are eliminated.

Rotating segments 143 and 144, during the period of current application to conductor 2, complete the circuit for relay 202 twice to provide a similar blanking function for the resistivity samples gated to the second recording channel. Segments 145 and 146 cooperate with current deck segment 133 and conductor 3 to complete the circuit for blanking relay 203 twice during the application of current to the formation between conductor 3 and sheath ground.

The rectification deck 160 has rotating segments 161, 162, and 163 which are identical to the segments 141, 143 and 145 of the blanking deck 140. Segments comparable to segments 142, 144 and 146 have been eliminated. Thus, segments 141 and 161, 143 and 162, and 145 and 163 are of the same lengths and contact their respective brushes at the same point of rotation. A battery source 164 is connected to rectification relays 204, 205 and 206 over lead 165 and their segments 161, 162 and 163. The operating path for relay 204 may be traced from the battery source 164 over lead 165, through segment 161 and brush 166, over lead 167 and through the winding of relay 204 to sheath ground. In a similar manner, the operating path for relay 205 is traced from battery 164 over lead 165, through moving segment 162 of the rectification deck 160 and brush 168 associated therewith, over lead 169 and through the winding of relay 205 to sheath ground. And finally, the operating path for relay 206 extends from battery 164 over lead 165, through moving segment 163 and brush 170 associated therewith, over lead 171 and through the winding of relay 206 to sheath ground. The coordinating operation of the blanking deck 140 and the rectification deck 160 produces blanked and rectified signal voltages comprising approximately 50 percent of the positive and negative half-cycles of the applied current wave form on a time-correlated basis. This will be more fully explained in connection with the utilization of the sample potentials of the current established fields.

Figure 3:
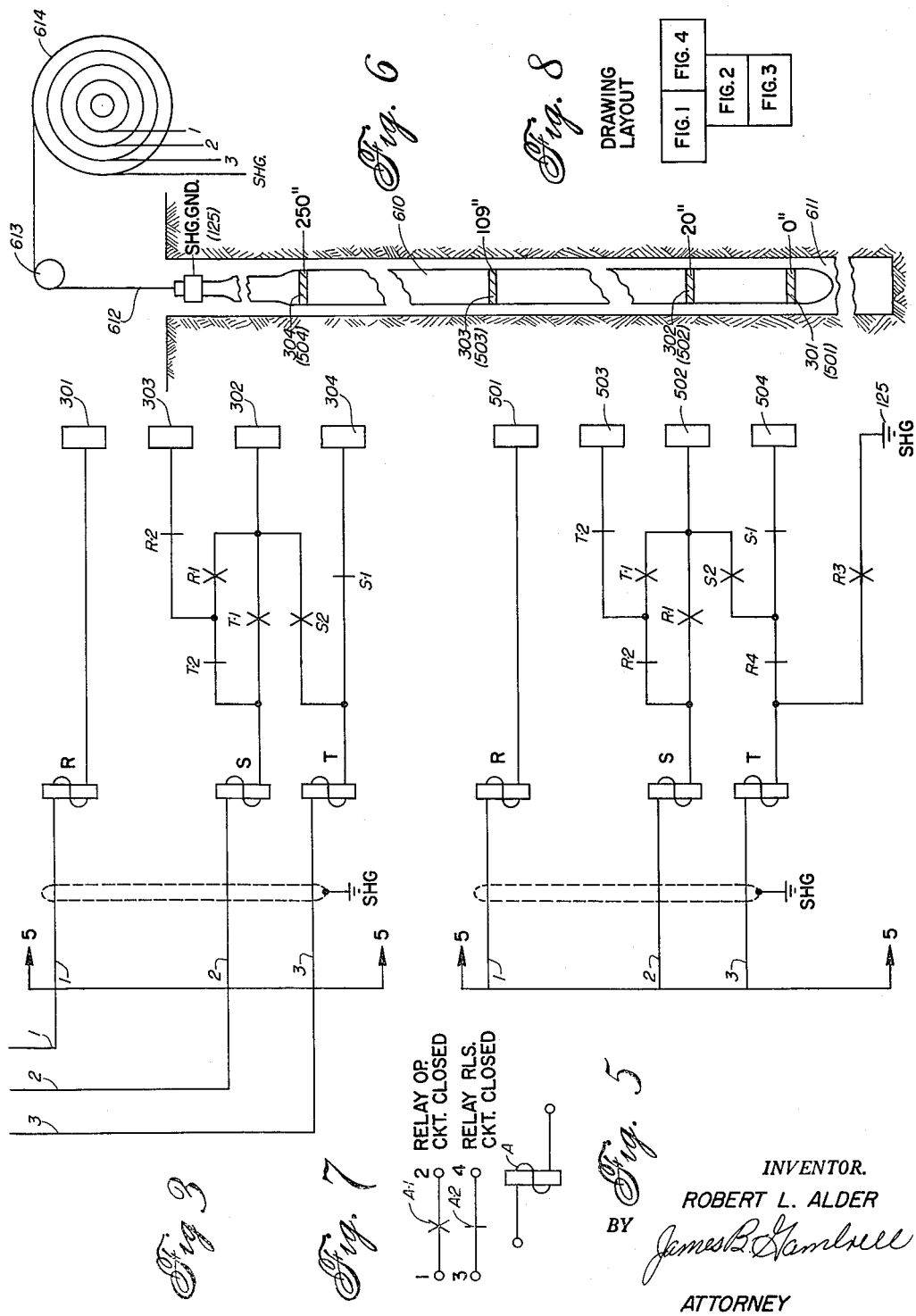
Fig. 3 represents one exemplary embodiment of the subsurface circuit and electrode arrangement forming part of the exemplary electrical logging system.

Now that the mechanical commutator, shown generally in Fig. 1, has been explained and the circuits and timing operations for the blanking relays 201, 202 and 203 and for the rectification relays 204, 205 and 206 considered, it is appropriate to describe the subsurface instrument circuitry shown generally in Fig. 3. Conductors 1, 2 and 3 are associated in the subsurface instrument with electrodes 301, 302, 303 and 304 through various contact configurations of relays R, S and T.

Before considering the various connections in the subsurface switching system, attention is directed to Fig. 7 where the symbols used in Figs. 3 and 5 are explained. An X on a lead indicates that a circuit path is completed through a make contact of a relay identified with reference thereto. For example, in Fig. 7, the X on the lead between terminals 1 and 2 is designated A–1 and means that the circuit therebetween is closed through a make or front contact of relay A (relay operated). The subscript 1 indicates that it is the first contact associated with relay A. Similarly the vertical lines shown on the lead between terminals 3 and 4 indicates that the circuit is closed over a back or break contact of relay A, and that the circuit is opened whenever relay A is operated. The subscript 2 accompanying the relay contact designation indicates that this particular back contact is the second contact associated with relay A. This shorthand symbolism will be more fully understood as Fig. 3 is considered.

Conductor 1 at the subsurface instrument is connected through the winding of relay R directly to electrode 301, whereas conductors 2 and 3 are connected through the windings of relays S and T, respectively, and front contact T–1 and back contact S–1, respectively, to electrodes 302 and 304, respectively. A path is also provided to connect conductor 3 to electrode 302 through front contact S–2 (Fig. 3). Conductor 2, which is associated with the winding of relay S may alternately be connected to electrode 302 through back contact T–2 and front contact R–1. And finally, conductor 2 may alternately be connected to electrode 303 through the back contact T–2 and the back contact R–2. To consider what these symbols mean in context, it can be appreciated that conductor 2, for example, will be connected to electrode 302 whenever relay T is operated (T–1 provides a closed path) or whenever relay T is released and relay R is operated (T–2 and R–1 provide a closed path).

As current flows between conductor 1 and sheath ground 125, relay R is operated in series therewith and a potential field is established adjacent the borehole between electrode 301 and a remote ground. At the time this potential field is established, the field is sampled by electrode 302 and conveyed to the surface over conductor 2 in a path including contacts R–1, T–2 and the winding of relay S. This unblanked signal is placed on front contact 1 of relay 201 in the short normal channel (Fig. 2). The wave form of this unblanked signals is illustrated as D in Fig. 4.

During the period in which the current field is established between conductor 1 and sheath ground, the blanking deck 140 causes blanking relay 201 to operate, as previously explained, thereby passing a blanked signal over contact 1 of relay 201 to the high side of the primary of transformer 230. As a result of the blanking operation of relay 201, the unblanked signal as represented by wave form D (Fig. 4), is converted into the wave form illustrated by G. The abscissa of this wave form constitutes approximately 50 percent of the period during which current of one polarity flows between conductor 1 and sheath ground. It will be noted that during the time blanking relay 201 is released, the input to transformer 230 is shorted over back contact 2 of relay 201 to surface ground. The operation of relay 201 provides an input path for the unblanked signal. The blanked signal is directed from the secondary of transformer 230 through an amplifier 231 to the primary of a transformer 232. terminals of the secondary of transformer 232 are connected to front and back contacts 1 and 2, respectively, of rectifying relay 204 while the signal is taken off between the swinger of relay 204 and a center tap on the secondary of transformer 232. From there is is directed through a stretching network including resistor 233 and capacitor 234 to a recording galvanometer 235.

With this arrangement, the blanked positive and negative pulses, as depicted at G, are converted through the synchronous rectifying relay 204 to a pair of positive square waves illustrated at J (Fig. 4). These are, in turn, stretched by the R-C circuit including resistor 233 and capacitor 234 to provide a constant voltage input M which drives galvanometer 235.

After the potential field is established between conductor 1 and sheath ground to permit a short normal resistivity curve to be obtained, the alternating current generated by the square wave generator 110 is connected over segment 132 on the current deck 130 to conductor 2. The potential field between conductor 2 and sheath ground is established between electrode 303 and sheath ground over a path including back contacts T-2 and R-2. During the time this field is established in the strata adjacent the borehole, it is sampled between electrodes 301 and 302, which are connected to conuctors 1 and 3, respectively. Electrode 301 is connected directly to conductor 1, whereas electrode 302 is connected to conductor 3, as noted above, through make contact S-2. The signal voltage detected between conductors 1 and 3 has a wave form as depicted at E (Fig. 4) and is transmitted to the front contact 1 of blanking relay 202, which path is associated with the short lateral indicating channel. Relay 202, operating in a manner similar to the operation of relay 201, removes a short circuit over back contact 2 thereof from the primary of transformer 240 and converts the unblanked signal of E to positive and negative blanked signals (see wave form H in Fig. 4) over front contact 1 of relay 202. From transformer 240, this short lateral resistivity sample traverses an amplifier 241 and an output transformer 242 to contacts associated with rectifying relay 205. The output terminals of transformer 242 are connected to the front contact 1 and back contact 2 of relay 205 and the rectified signal is taken from the swinger of relay 205 and a center tap on the secondary of transformer 242, through an R-C stretching network including resistor 243 and capacitor 244 to a galvanometer 245. The rectified wave form is depicted as wave form K (Fig. 4) and the galvanometer input is a constant voltage (wave form N). The circuit arrangement of this channel is identical to that of the SN channel except for component values.

The third current field over conductor 3 and sheath ground is established between electrode 304 (over back contact S-1) and sheath ground. The sample of deep or long lateral resistivity value is concomitantly sampled between electrodes 301 and 302 which are in turn connected to conductors 1 and 2, respectively. As before, electrode 301 is directly connected to conductor 1 while electrode 302 is connected to conductor 2 over front contact T-1. The signal potential existing between conductors 1 and 2 as a result of the establishment of the third field appears as an unblanked signal (wave form F in Fig. 4) at the front contact 1 of blanking relay 203. As relay 203 is caused to operate, during the middle portion of the positive and negative half-cycles of the square wave current, it blanks the signal shown at F and produces the blanked signals depicted by wave form I, which signals are connected to the primary of transformer 250. Again, it is to be noted that the input winding of transformer 250 is shorted over back contact 2 of relay 203, except when the relay 203 is operated to permit the passage of the middle portion of the unblanked signals. The blanked signals are passed through the secondary of transformer 250 and amplifier 251 to the primary of the output transformer 252. From here the signals are routed to galvanometer 255 over a circuit similar to that of the SN and SL channels, that is to say, the output terminals of transformer 252 are connected to front contact 1 and back contact 2, respectively, of relay 206 and the rectified wave form (as shown at L in Fig. 4) is taken off between the swinger of relay 206 and a center tap on the output winding of transformer 252. It passes through an R-C stretching network including resistor 253 and capacitor 254 before actuating galvanometer 255. The galvanometer input for this channel is shown as wave form O (Fig. 4).

A fourth, natural potential, curve is obtained by a combination including conductors 2 and 3. The N.P. deck 180 (Fig. 1) has three rotating segments 181, 182 and 183, which permit the passage of a natural potential voltage to the natural potential indicating means (Fig. 2) in a preselected sequence. In the particular embodiment illustrated, and it is only exemplary, brushes associated with each of the segments 181, 182 and 183 are commoned to a lead 184 which is fed into 0 to 2 c.p.s. low pass filter from whence it passes through an R-C stretching network including resistor 260 and capacitor 261 to a galvanometer 262. The lower side of galvanometer 262 is connected to surface ground (S.G.) rather than sheath ground. When the current is flowing through conductor 1 and thereafter through conductor 3, a circuit is completed during the intermediate portion thereof over lead 221 and brush 185, and over lead 222 and brush 189, respectively, to the input lead 184 connected to the natural potential indication channel. In a somewhat similar manner, during the period in which current flows in conductor 2, a natural potential is transmitted over conductor 3 and lead 220 and brush 187 to input lead 184. Thus, during each complete cycle of sampling the three resistivity values, a natural potential is detected between conductor 2 and surface ground when the current flows through conductor 1 or 3 and between conductor 3 and surface ground when current flows through conductor 2. This provides a continuous natural potential log along with the three previously described resistivity logs.

The particular combinations of conductors and electrodes which are employed in the exemplary embodiment of the electrical logging system as depicted in Figs. 1, 2 and 3 are as follows:

| Curve | Current | | Pickup | |
|---|---|---|---|---|
| | Conductors | Electrodes | Conductors | Electrodes |
| SN | 1<br>SHG | $C_1=0''$<br>$C_2=SHG$ | 2<br>S.G. | $P_1=20''$<br>$P_2=S.G.$ |
| SL | 2<br>SHG | $C_1=109''$<br>$C_2=SHG$ | 3<br>1 | $P_1=20''$<br>$P_2=0''$ |
| LL | 3<br>SHG | $C_1=250''$<br>$C_2=SHG$ | 2<br>1 | $P_1=20''$<br>$P_2=0''$ |
| NP | {3 or 1<br>SHG<br>and<br>2<br>SHG | | 2<br>S.G.<br>3<br>S.G. | $P_1=20''$<br>$P_2=S.G.$<br>$P_1=20''$<br>$P_2=S.G.$ |

Fig. 5 is an alternative subsurface configuration which may replace the subsurface circuitry of Fig. 3. The changes in the interconnections of the conductors 1, 2 and 3 and electrodes 501—504, which electrodes correspond to electrodes 301—304 of Fig. 3, are designed to permit the same system to obtain, in addition to the short normal, short lateral and long lateral resistivity curves and the natural potential curve, a bridge curve which necessitates sheath ground 125 being placed on one conductor (conductor 3) while current flows between that conductor and one other (not sheath ground). The resistance is measured between the junction of balancing resistors and sheath ground. The measuring circuit is shown schematically on Fig. 9 wherein an alternating source is connected between conductors 1 and 3, the lumped resistances of which are depicted as $R_1$ and $R_3$, to complete a circuit through electrode 501, unknown bridge resistance $R_x$ (which is to be measured) and sheath ground 125. Resistances $R_1'$ and $R_3'$ balance the galvanometer G with unknown resistance $R_x$ shorted and resistance R and capacitor C act as a pulse stretching network to provide constant voltage to the galvanometer G. With the bridge balanced, the galvanometer G will measure the resistance $R_x$.

Referring to the alternative embodiment of Fig. 5, it will be noted that conductor 1 is connected through the winding of relay R to electrode 501, while conductor 2 is connected through the winding of relay S and a front contact R–1 to electrode 502. An alternate path for conductor 2 to be connected to electrode 502 is provided over break contact R–2 and front contact T–1. Conductor 3 is connected through the winding of relay T to electrode 504 over back contacts R–4 and S–1. Conductor 3 may also be connected to sheath ground 125 over make contact R–3 or to electrode 502 over back contact R–4 and front contact S–2. Finally, conductor 2 may be connected to electrode 503 over back contacts R–2 and T–2.

In order to obtain the curve combinations invisioned by the subsurface arrangements of Fig. 5, the conductor and electrode combinations tabulated above would be obtained and thereafter the following additional association would be required:

| Curve | Current | | Pickup | |
|---|---|---|---|---|
| | Conductors | Electrodes | Conductors | Electrodes |
| Bridge (Resistance) | {3<br>{1 | $C_1$=SHG<br>$C_2$=0" | 3<br>SHG | } At Surface. |

It should be readily apparent that another indication and recording channel must be provided at the surface in addition to those previously described for use with the SN, SL, LL, and NP curves (Fig. 2) before the bridge curve can also be run. A modification of the surface commutator of Fig. 1 is also necessary to place current between conductors 1 and 3 on a time-sharing basis with the three previously described current fields.

The sequence of events for obtaining the additional bridge curve implicit in Fig. 5 would find the surface commutator having four groups of segments, three of them similar to those previously described but covering a total of 90° rather than 120°, plus a fourth segment so arranged on a time-sharing basis with the 3 to commutate the current to the conductors 1 and 3 after the three previous curves are obtained. In this case the decks 130, 140, 160 and 180 would have to have four time-sharing periods rather than three and would thereby necessitate 4:1 gear reduction with respect to the square wave generator 110. Instead of sequentially establishing three alternating current fields, the square wave generator 110 would cooperate with the current deck 130 to establish four current fields on a time-sharing basis.

The electrical logging system as described herein is not limited to the particular embodiments with which it is described, rather it represents an illustrative example of the way in which subsurface relays may be used to provide an electrical logging system capable of obtaining more curves for a given number of conductors than any previously existing systems. Therefore, while the present invention has been described in accordance with the exemplary embodiment, it is not to be so restricted. Numerous other arrangements may be envisioned by those skilled in the art without departing from the scope of the present invention.

I claim:
1. A system for measuring a plurality of characteristics of formations adjacent a borehole comprising, in combination, a cable having at least three conductors, one of which may be the cable sheath; a subsurface instrument attached to said cable and including a plurality of current emanating and detecting means, which plurality exceeds the number of said conductors, each of said current emanating and detecting means associable with at least one of said conductors and each of said conductors associated at all times with one of said current emanating and detecting means; means associated with said cable for causing said instrument to traverse the extent of said borehole at times; switching means operable to associate at least one of said conductors with more than one of said current emanating and detecting means; means for supplying current through at least two unique pairs of conductors in a preselected sequence to thereby establish time displaced potential fields in the formations adjacent said borehole; means including current emanating and detecting means and conductors other than instant current carrying ones for sampling the instant established potential field; and, means responsive to current flow through at least one of said pairs of conductors to control said switching means.

2. A system for measuring a plurality of characteristics of formations adjacent a borehole, at least some of which are transmitted to surface indicating means on a time-sharing basis, comprising, in combination, a cable having at least three conductors, one of which may be the cable sheath; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switching means operable to alternately associate at least one of said conductors with one of two of said electrodes; means for supplying current through at least a pair of said conductors at times to thereby establish at least one potential field in the formations adjacent said borehole; means including conductors and electrodes other than instant current carrying ones for sampling the instant establish potential field; and, means responsive to current flow through said pair of conductors to control said switching means.

3. A system for measuring a plurality of characteristics of formations adjacent a borehole, at least some of the measurements of which are transmitted to surface indicating means on a time-sharing basis, comprising, in combination; a cable having at least three conductors, one of which may be the cable sheath; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switch-means operable to alternately associate one of said conductors with one of two of said electrodes; means for supplying current through at least two pairs of said conductors in a preselected sequence to thereby establish time displaced potential fields in the formations adjacent said borehole; means including conductors and electrodes other than instant current carrying ones for sampling the instant established potential field; and, means responsive to current flow in at least one of said pairs of conductors to control said switching means.

4. A system for measuring a plurality of characteristics of formations adjacent a borehole, at least some of the measurement of which are transmitted to surface indicating means on a time-sharing basis, comprising, in combination; a cable having at least four conductors; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switching means operable to associate at least one of said plurality of conductors alternately with preselected electrodes forming a distinct pair; means for supplying current through selected ones of said conductors to thereby establish time displaced potential fields in the formations adjacent said borehole; means including at least one of said current carrying conductors other than an instant current carrying one for sampling the instant established potential field; and, means responsive to current flow in at least one of said conductors to control said switching means.

5. A system for measuring a plurality of characteristics of formations adjacent a borehole, at least some of which are transmitted to surface indicating means on a time-sharing basis, comprising, in combination, a cable having at least four conductors; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switching means to associate each one of a plurality of said conductors with each one of a unique pair of electrodes associable with that particular conductor; means for supplying current through selected ones of said conductors and their associated electrodes in a preselected sequence thereby to establish time displaced potential fields in the formations adjacent said borehole; means including conductors and electrodes other than instant current carrying ones for sampling each potential field as it is established; and, means associated with said conductors and responsive to current flow in at least one of them to coordinate the establishment of said fields and said sampling thereof by controlling said switching means.

6. A system for measuring a plurality of characteristics of formations adjacent a borehole, at least some of which are transmitted to surface indicating means on a time-sharing basis, comprising, in combination, a cable having at least four conductors, a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; a plurality of unique pairs of said electrodes, each pair of which is associable with a preselected one of said plurality of conductors; switching means operable to associate each one of said plurality of said conductors alternately with the electrodes forming its associated unique pair; means for sequentially supplying current through selected ones of said conductors and their associated electrodes to thereby establish time displaced potential fields in the formations adjacent said borehole; means determined by the state of said switching means and including conductors and electrodes other than instant current carrying ones for sampling the instant established potential fields; and, means associated with said conductors and responsive to current flow in at least one of them to coordinate the establishment of said fields and said sampling thereof by the control of said switching means.

7. A system for measuring a plurality of characteristics of formations adjacent a borehole, at least some of which are transmitted to surface indicating means on a time-sharing basis, comprising, in combination, a subsurface instrument; a cable having at least four conductors; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; at least two unique pairs of said electrodes, each pair of which is associable with a unique one of said conductors; switching means associated with at least two of said conductors and operable to associate each one of said conductors alternately with the electrodes forming its associable unique pair; means for sequentially supplying current through selected ones of said conductors and their associated electrodes to thereby establish time displaced potential fields in the formations adjacent said borehole; means determined by the state of said switching means and including conductors and electrodes other than instant current carrying ones, for sampling each potential field when it is established; and, means associated with at least two of said conductors and responsive to current flow therein to coordinate the establishment of said fields and said sampling thereof by the control of said switching means.

8. A system for measuring a plurality of characteristics of formations adjacent a borehole, at least some of which are transmitted to surface indicating means on a time-sharing basis, comprising, in combination, a shielded cable having three conductors, a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switching means associated with said three conductors and operable to associate at least one of said conductors alternately with each one of two of said electrodes; means for applying a source of current between each one of at least two of said conductors and the cable sheath in a preselected sequence to thereby establish a plurality of time displaced potential fields in the formations adjacent said borehole; means including conductors and electrodes other than instant current carrying ones for sampling the potential fields when they are established; and, means associated with at least two of said conductors and responsive to current flow therein to coordinate the establishment of said fields and said sampling thereof by the control of said switching means.

9. A system for obtaining a plurality of characteristics of formations adjacent a borehole, at least some of the measurements of which are transmitted to surface indicating means on a time-sharing basis, comprising, in combination, a shielded cable having three conductors; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switching means associated with said three conductors and operable to preselectedly associate a first and a second of said conductor each with each of two of said electrodes forming unique pairs associable with the conductors; means for applying a source of current between each of said three conductors and the cable sheath in a preselected sequence to thereby establish a plurality of time displaced potential fields in the formations adjacent said borehole; means including conductors and electrodes other than instant current carrying ones for sampling the potential fields when they are established; means associated with said three conductors and responsive to the presence and absence of current flow in said conductors to coordinate the establishment of said fields and said sampling thereof by the control of said switching means; and, a plurality of surface indicating means cooperating with said conductors to record the sampled potentials for each established field.

10. A system for performing measurements of a plurality of characteristics of formations adjacent a borehole, at least some of which measurements are transmitted to surface indicating means on a time-sharing basis, comprising, in combination, a shielded cable having three conductors; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switching means associated with said three conductors and operable to associate at least one of said conductors alternately with each one of two of said electrodes; means for applying a source of current between each of said conductors and the cable sheath in a preselected sequence to thereby establish a plurality of time displaced potential fields in the formations adjacent said borehole; means including conductors and electrodes other than instant current carrying ones for sampling the potential fields when they are established; means associated with at least two of said conductors and responsive to current flow therein to coordinate the establishment of said fields and said sampling thereof by the control of said switching means; and, a secondary signal system including at least one of said conductors and one of said electrodes for transmitting direct current voltages to said surface indicating means to provide a record of the natural potential of the earth.

11. A system for performing measurement of a plurality of characteristics of formations adjacent a borehole, at least some of which measurements are transmitted to surface indicating means on a time-sharing basis, comprising, in combination, a shielded cable having three conductors; a subsurface instrument attached to said cable and including a plurality of electrodes, which plurality exceeds the number of said conductors, each of said electrodes associable with at least one of said conductors and each of said conductors associated at all times with one of said electrodes; means associated with said cable for causing said instrument to traverse the extent of said borehole at times; switching means associated with said three conductors and operable to preselectively connect some of said conductors alternately to first one and then to the other of two electrodes forming a unique pair associated with each of said some conductors; means for applying a source of current between each of said conductors and the cable sheath in a preselected sequence to thereby establish a plurality of time displaced potential fields in the formations adjacent said borehole; means including conductors and electrodes other than the instant current carrying ones for sampling the potential fields as they are established; and, means associated with said three conductors and responsive to current flow therein to synchronize the operation of said switching means with the establishment of said fields.

References Cited in the file of this patent

UNITED STATES PATENTS

| | | |
|---|---|---|
| 2,617,852 | Waters | Nov. 11, 1952 |
| 2,779,912 | Waters | Jan. 29, 1957 |
| 2,838,731 | Cruzan | June 10, 1958 |